(12) United States Patent
Laird-McConnell et al.

(10) Patent No.: US 11,349,679 B1
(45) Date of Patent: May 31, 2022

(54) CONVERSATIONAL AI FOR INTELLIGENT MEETING SERVICE

(71) Applicant: Microsoft Technology Licensing, LLC, Redmond, WA (US)

(72) Inventors: Thomas Matthew Laird-McConnell, Kirkland, WA (US); Steven Ickman, Camano Island, WA (US); Christopher Lee Mullins, Sammamish, WA (US); Lili Cheng, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/207,476

(22) Filed: Mar. 19, 2021

(51) Int. Cl.
| | | |
|---|---|---|
| *H04L 12/18* | (2006.01) | |
| *G10L 15/26* | (2006.01) | |
| *G06N 20/00* | (2019.01) | |
| *G06Q 10/06* | (2012.01) | |
| *G06F 40/30* | (2020.01) | |

(52) U.S. Cl.
CPC .......... *H04L 12/1831* (2013.01); *G06F 40/30* (2020.01); *G06N 20/00* (2019.01); *G06Q 10/06316* (2013.01); *G10L 15/26* (2013.01); *H04L 12/1822* (2013.01)

(58) Field of Classification Search
CPC ....... G06F 40/30; G06F 3/1415; G06N 20/00; G06N 5/02; G06Q 10/06316; G06Q 10/06398; G06Q 10/1095; G06Q 10/10; G06Q 30/02; G10L 15/26; G10L 15/22; G10L 17/00; H04L 12/1822; H04L 12/1831; H04L 65/4038
See application file for complete search history.

(56) References Cited

U.S. PATENT DOCUMENTS

| | | | |
|---|---|---|---|
| 7,447,608 B1 * | 11/2008 | Poston | ................ H04L 12/1822 |
| | | | 702/177 |
| 9,165,073 B2 | 10/2015 | Kiraz et al. | |
| 10,535,352 B2 * | 1/2020 | Pankanti | ................ G10L 15/22 |

(Continued)

OTHER PUBLICATIONS

"Turn off automatic video in a call in Teams", Retrieved from: https://web.archive.org/web/20201105224512/https://support.microsoft.com/en-us/office/turn-off-automatic-video-in-a-call-in-teams-a32bd419-00a4-4da6-898c-242b745a21c7, Nov. 5, 2020, 3 Pages.

(Continued)

*Primary Examiner* — Le H Luu
(74) *Attorney, Agent, or Firm* — Workman Nydegger

(57) ABSTRACT

A computing system for real-time analyzing meeting conversations using artificial intelligence (AI) is configured to establish a meeting communication channel that facilitates a meeting among multiple client systems. Each of the multiple client systems corresponds to a meeting participant. In response to receiving communication from the multiple client systems, the computing system analyzes currently received communication via an AI engine while the meeting remains active. The currently received communication is communication received within a rolling time window ending at a current time. Based on the analysis, the computing system identifies an agenda item that has a highest correlation with the currently received communication or a task that is assigned to at least one of the participants, and causes, in substantially real time, at least one of the plurality of the client systems to display the agenda item or add the task to a task list.

20 Claims, 9 Drawing Sheets

(56) References Cited

U.S. PATENT DOCUMENTS

| | | |
|---|---|---|
| 11,182,748 B1 * | 11/2021 | Neckermann ............ G06N 5/02 |
| 2014/0095161 A1 | 4/2014 | Waite et al. |
| 2014/0258406 A1 * | 9/2014 | Salesky ................. G06F 3/1415 |
| | | 709/204 |
| 2015/0213395 A1 | 7/2015 | Swanson et al. |
| 2016/0323333 A1 * | 11/2016 | Aggarwal ........... H04L 65/4038 |
| 2018/0039951 A1 | 2/2018 | Wynn et al. |
| 2019/0108493 A1 | 4/2019 | Nelson et al. |
| 2019/0273627 A1 * | 9/2019 | Whalin .................. G06Q 30/02 |
| 2019/0378076 A1 * | 12/2019 | O'Gorman ....... G06Q 10/06398 |
| 2020/0005248 A1 * | 1/2020 | Gerzi ................. G06Q 10/1095 |
| 2020/0279567 A1 * | 9/2020 | Adlersberg ............. G10L 17/00 |
| 2020/0372466 A1 * | 11/2020 | Bastide ................. G06Q 10/10 |

OTHER PUBLICATIONS

Streitbörger, Til, "Agenda creation made easy", Retrieved from: https://www.empowersuite.com/en/blog/agenda-creation-made-easy, Nov. 26, 2018, 23 Pages.

\* cited by examiner

CONVERSATIONAL AI FOR INTELLIGENT MEETING SERVICE

BACKGROUND

Computer systems and related technology affect many aspects of society. Indeed, the computer system's ability to process and communicate information has transformed the way we live and work. With the widespread adoption of the Internet, and with many computing devices possessing audiovisual hardware (e.g., video camera, microphone, etc.), online meetings (i.e., videoconferencing) have proliferated, both for personal and business use. People around the world, regardless of their location, can use video, audio, and text to linkup online via meeting applications and services. Such meeting applications and services allow people to communicate face-to-face and share information and data in real-time without being physically located together.

In addition to replicating the experience of in-person group conversations, some meeting services or applications also allow recording of the meetings and post-processing of the recorded meetings. For example, some meeting services allow the meeting participants to download the recorded meetings to their local devices. Some meeting services transcribe the recorded meetings into text data.

The subject matter claimed herein is not limited to embodiments that solve any disadvantages or that operate only in environments such as those described above. Rather, this background is only provided to illustrate one exemplary technology area where some embodiments described herein are practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to a conversational artificial intelligence (AI) engine that is implemented at a computing system (e.g., a server) that provides an intelligent meeting service. The computing system is configured to establish a meeting communication channel that facilitates a meeting among multiple client systems. Each of the client systems corresponds to a meeting participant. After the meeting communication channel is established, the computing system receives communication from the multiple client systems. While the meeting remains active, the computing system analyzes currently received communication via the AI engine to generate one or more results. The currently received communication is communication received within a rolling time window ending at a current time. In some embodiments, the rolling time window has a predetermined size and a predetermined shift amount. In some embodiments, depending on the computing system's processing capabilities, the rolling time window and the shift amount is adjustable, and each rolling windows is set to overlap or not overlap a previous or a following window.

Still, while the meeting remains active, the computing system then causes, in substantially real time, at least one of the client systems to perform one or more actions in response to the one or more results. For example, in some embodiments, the one or more actions include (but are not limited to) displaying an agenda item that is the most relevant to the currently received communication, displaying a list of decisions made during the meeting, displaying a list of tasks assigned to participants during the meeting, and/or adding a task to a task list of a particular participant.

The communication from the multiple client systems includes (1) audio communication, (2) visual communication, (3) audiovisual communication, and/or (4) text communication. The AI engine includes at least one of (1) an audio data processor configured to process audio data associated with the audio communication and/or audiovisual communication, (2) a natural language processor configured to process text data associated with the text communication and/or text data transcribed from the audio communication and/or the audiovisual communication, or (3) a visual data processor configured to process visual data associated with the visual communication and/or audiovisual communication.

In some embodiments, the audio data processor includes a transcriber configured to transcribe, in substantially real time, audio data associated with the audio communication and/or the audiovisual communication into text data. The natural language processor is configured to extract one or more textual features from the text data received from the text communication or transcribed from the audio data associated with the audio communication and/or audiovisual communication. In some embodiments, the transcriber is a speech-to-text engine that merely converts audio data into text data. In some other embodiments, the transcriber is a speech recognition engine that not only converts audio data into text data, but also performs some of the text processing, extracting semantic meanings of the converted text data. The visual data processor is configured to extract one or more visual features from the video data associated with the visual communication and/or audiovisual communication.

In some embodiments, the computing system is further configured to receive an agenda of the meeting with multiple agenda items. In response to receiving the agenda, the natural language processor extracts one or more textual features for each of the agenda items based on text data associated with the agenda. The natural language processor also extracts one or more textual features based on text data associated with currently received communication. Based on the textual features corresponding to the currently received communication and the textual features corresponding to the agenda, a correlation between the currently received communication and each of the agenda items is determined, and a particular agenda item that has a highest correlation with the currently received communication is identified.

In some embodiments, the computing system is further configured to generate a Venn diagram or a heatmap, representing the correlation between the currently received communication and each of the plurality of agenda items. The Venn diagram or the heatmap is then caused to be displayed at one or more of the client systems.

In some embodiments, the computing system sends the particular agenda item that has the highest correlation with the currently received communication to one or more of the client systems, causing the particular agenda item to be displayed at the one or more client systems. In some embodiments, an input field is also caused to be displayed next to the displayed agenda item. The input field is configured to (1) receive a confirmation or rejection from the at least one client system, (2) receive a selection of a different agenda item included in the plurality of agenda items from the at least one client system, or (3) receive a manual input of a new agenda item that is not included in the plurality of agenda items from the at least one client system.

In some embodiments, the multiple agenda items are displayed at the one or more of the client systems as a list. The sending of the particular agenda item causes the particular agenda item that has the highest correlation with the currently received communication to be displayed in a different format. For example, in some embodiments, the particular agenda item is displayed in a different size, color, font, be highlighted, moving, and/or flashing.

In some embodiments, the natural language processor is further configured to identify that a task is assigned to a particular participant based on the textual features extracted from the text data associated with the currently received communication and send the task to at least one of the client systems corresponding to the particular participant. In some embodiments, the sending of the task to the client system of the particular participant causes the task to be added to a task list of the client system.

In some embodiments, the natural language processor is further configured to identify that a decision is made based on the textual features extracted from the text data associated with the currently received communication and send the decision to one or more of the client systems. In some embodiments, the natural language processor is further configured to append the decision to a list of decisions that are previously identified during the meeting and send the list of the decision to the one or more client systems at an end of the meeting.

In some embodiments, the AI engine is further configured to determine an amount of communication received from each of the client systems for each of the agenda items. In some embodiments, the visual data processor is further configured to determine a current level of interest of each participant based on the visual features extracted from the visual data associated with the currently received communication. In some embodiments, the AI engine is further configured to generate a heatmap representing the amount of communication received from each of the client systems for each of the agenda items, and/or a heatmap representing the current level of interest of each participant. The heatmap(s) is displayed at one or more of the client systems.

In some embodiments, the computing system is further configured to send a notification to a particular client system based on the amount of communication received from the participant and/or the current level of interest of the participant corresponding to the particular client system.

In some embodiments, the AI engine is further configured to allocate a time period for each of the plurality of the agenda items and track a time spent on each agenda item and a time left in the meeting. In response to determining that a particular agenda item has taken longer than the allocated time period, the computing system is configured to send a notification to at least one of the client systems.

Additional features and advantages will be set forth in the description which follows, and in part will be obvious from the description, or can be learned by the practice of the teachings herein. Features and advantages of the invention can be realized and obtained by means of the instruments and combinations particularly pointed out in the appended claims. Features of the present invention will become more fully apparent from the following description and appended claims or can be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments that are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

Figure 1:
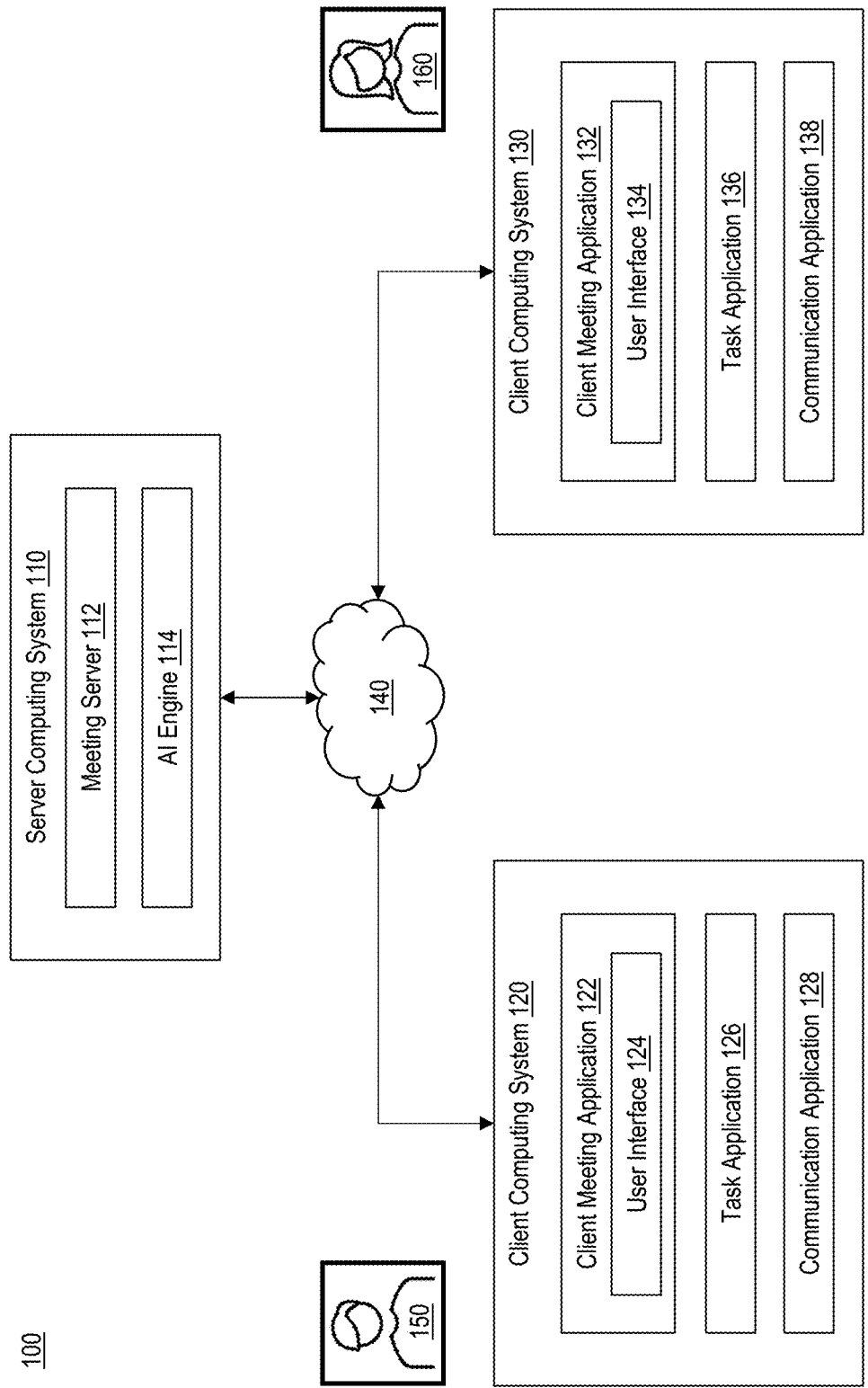
FIG. 1 illustrates an example of an environment in which a server computing system provides intelligent meeting service to multiple client computing systems.

Existing meeting services or applications allow recording of the meetings and post-processing of the recorded meetings. However, such meeting services or applications generally are not capable of real-time processing or analyzing the currently received communication data.

The embodiments described herein are related to a conversational artificial intelligence (AI) engine that is implemented at a computing system (e.g., a server) that provides an intelligent meeting service. The intelligent meeting service provides real-time analysis of communication received from the participants' computers and generates real-time feedback to the participants' computers. In some embodiments, based on the analysis, the intelligent meeting service is capable of real-time transcribing the audio content into text data, identifying an agenda item that is the most relevant to the current discussion, and displaying the agenda item at the participants' computers via a user-friendly graphic user interface. In particular, the AI engine performs the real-time processing of the meeting data using machine learning, including (but not limited to) neural networks, logic decision trees, and confidence assessment, improving the functionality of the computing system and providing a technical contribution.

Further, when users participate in an online meeting via an existing meeting service, users often have to open an agenda document in a separate window, and constantly scroll through the agenda document during the meeting to follow the agenda items. When a participant joins a meeting late, or comes back from a break, the participant then has to search the agenda document for the agenda item that is currently being discussed. The intelligent meeting service described herein provides a specific solution to the above described technological problems in computers and prior art meeting services. The specific solution includes real-time identifying an agenda item that is the most relevant to the current communication and causing the agenda item to be displayed at the meeting participant's device via a user-friendly graphic user interface, such that users do not have to navigate through the agenda document constantly and search for and/or memorize the agenda items. The intelligent meeting service described herein allows meeting participants' computers, for the first time, to display and provide instant access to an agenda item that is the most relevant to the current discussion.

Additionally, in some embodiments, the user-friendly graphical user interface described herein also allows users to interact with the displayed agenda items and tasks. For example, a participant is allowed to manually change the automatically identified agenda items or the tasks, and the participant's input can also be used as additional training data for improving the AI engine, which provides an additional technical contribution.

Generally, artificial intelligence (AI) includes using computing systems to solve problems intelligently, including (but not limited to) natural language processing, knowledge representation, automated reasoning, machine learning, computer vision, and/or robotics. Some or all these AI techniques are implemented at the AI engine described herein. In particular, the AI engine is capable of performing natural language processing, using machine-learned models to identify agenda items and other objects based on the raw communication data (e.g., audio data, visual data, etc.). Different machine learning techniques are used to train these machine learned models, such as (but not limited to) automatic speech recognition, different learning decision trees, linear or non-linear regressions and/or classifications, supervised/unsupervised learnings, artificial neural networks, parametric/nonparametric models, support vector machines, and/or ensemble learning. In some embodiments, training data used in training an automatic speech recognition model include speech samples performed by different speakers reading a same passage. In some embodiments, these different speakers include participants from different countries and have different language backgrounds. These speech samples are then fed into a deep neural network to train the speech recognition model. In some embodiments, training data used in training a natural language model or a text language model include different phrases that are tagged as a decision and/or a task. In some embodiments, a learning decision tree is implemented to determine a similarity between current communication with each agenda item.

FIG. 1 illustrates an environment 100 in which a server computing system 110 is configured to provide intelligent meeting service to multiple client computing systems 120 and 130 via a computer network 140. Each of the client computing systems 120, 130 corresponds to a meeting participant 150, 160. Hereinafter, the server computing system 110 is also referred to as "the server system," and the client computing systems 120, 130 are also referred to as "the client systems."

The server system 110 includes a meeting server 112, and each of the client systems 120, 130 includes a client meeting application 122, 132. The meeting server 112 is configured to establish a meeting communication channel that facilitates a meeting among the multiple client systems 120, 130 via the client meeting application 122, 132. The client meeting application 122, 132 includes a user interface 124, 134 configured to allow each participant to interact with the client meeting application 122, 132. In some embodiments, the client meeting application 122, 132 is a dedicated meeting application. In some embodiments, the client meeting application 122, 132 is a chat or a video call application that allows multiple parties to join a same chat session or a same video call. In yet some embodiments, the client meeting application 122, 132 is a browser having an add-on component or be part of the operating system of the client systems 120, 130. In some embodiments, the establishing of the meeting communication channel includes having each participant 150, 160 to click a particular URL and/or requiring each participant 150, 160 to login to an account associated with the meeting service.

As illustrated, the server system 110 also includes an AI engine 114 configured to analyze communications transmitted from the multiple client systems 120, 130 in substantially real time. After the meeting communication channel is established, the meeting server 112 is configured to receive communication from the multiple client systems 120, 130. Currently received communication is then passed to the AI engine 114, which in turn analyzes, in substantially real time, the currently received communication to generate one or more outputs or results. Note, in some embodiments, the "currently received communication" is the communication received within a rolling time window up to a current time. In some embodiments, the rolling time window has a predetermined size and a predetermined shift amount. In some embodiments, depending on the computing system's processing capabilities, the rolling time window and the shift amount is adjustable, and each rolling windows is set to overlap or not overlap a previous or a following window. For example, when the predetermined size is 1 minute, and a shift amount is 30 seconds, the currently received communication is the communication received within 1 minute up to the current time. Since the shift amount is 30 seconds, each window overlaps with its previous and following window by 30 seconds. In some embodiments, the "currently received communication" is a most recently identified sentence that was said by one of the participants 150, 160. In any case, the "currently received communication" is the communication received fairly recently.

The server system 110 then causes, in substantially real time, at least one of the client systems to perform one or more actions in response to the one or more results. For example, in some embodiments, the one or more actions include (but are not limited to) displaying an agenda item that is the most relevant to the currently received communication, a list of decisions made during the meeting, a list of tasks assigned to participants during the meeting, and/or adding a task to a task list of a particular participant.

For example, as illustrated, each client system 120 also includes a task application 126, 136 and/or another communication application 128, 138 (e.g., an email application, a text messaging application). Base on the analysis results of the AI engine 114, a new task is added to the task application 126, 136 of the corresponding participant 150, 160, and/or a decision made during the meeting is sent to at least one of the participants 150, 160 via the communication application 128, 138. Note, even though the task application 126, 136 and the communication application 128, 138 are shown as being separate from the client meeting application 122, 132, in some embodiments, the task application 126, 136 and/or the communication application 128, 138 are components of the client meeting application 122, 132.

Figure 2:
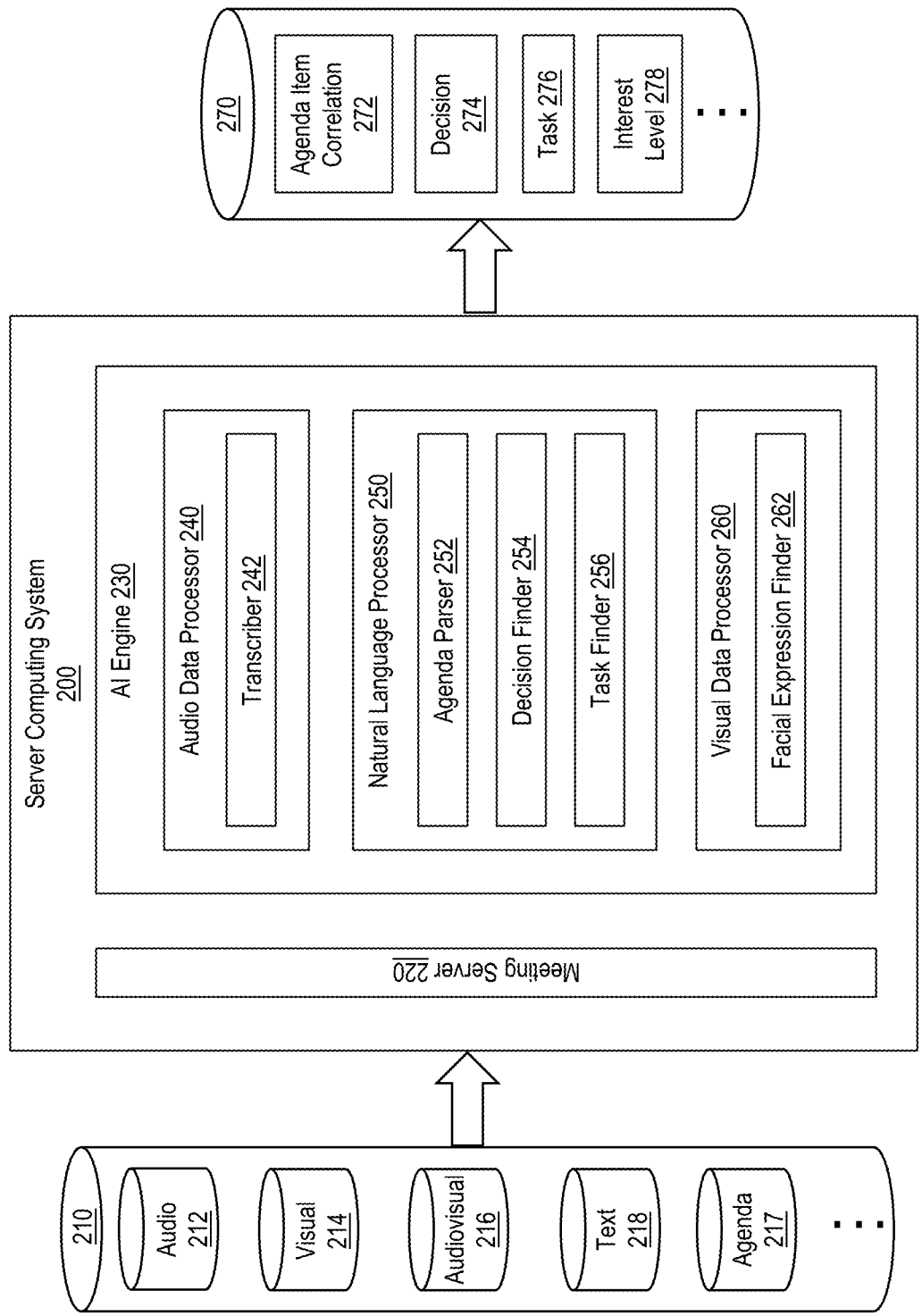
FIG. 2 illustrates an example of an architecture of a server computing system configured to provide intelligent meeting service.

FIG. 2 further illustrates an example of an architecture of the server system 200 that corresponds to the server system 110 of FIG. 1. The server system 200 includes a meeting server 220 (that corresponds to the meeting server 112 of FIG. 1) and an AI engine 230 (that corresponds to the AI engine 114 of FIG. 1). The meeting server 220 is configured to receive communications 210 from each of the client systems 120, 130 to generate one or more results 270. For example, in some embodiments, the one or more results include (but are not limited to) correlations 272 between the current communication and multiple agenda items, a decision 274 made during the meeting, a task 276 assigned to a participant during the meeting, and/or a current interest level 278 of each participant at the meeting.

The communication 210 from the client systems 120, 130 includes (1) audio communication 212, (2) visual communication 214, (3) audiovisual communication 216, and/or (4) text communication 218. In some embodiments, the client system 120, 130 is also allowed to upload an agenda 217 to the meeting server 220. The AI engine 230 includes at least one of (1) an audio data processor 240 configured to process audio data associated with the audio communication 212 and/or audiovisual communication 216, (2) a natural language processor 250 configured to process text data associated with the text communication 218 and/or text data transcribed from the audio communication 212 or the audiovisual communication 216, or (3) a visual data processor 260 configured to process visual data associated with the visual communication 214 and/or audiovisual communication 216.

In some embodiments, the audio data processor 240 includes a transcriber 242 configured to transcribe, in substantially real time, audio data associated with the currently received communication into text data. In some embodiments, the transcriber 242 is a speech-to-text engine that merely converts audio data into text data. In some embodiments, the transcriber 242 is a speech recognition engine that not only converts audio data into text data, but also performs additional text processing. The natural language processor 250 is configured to extract one or more textual features from the text data received from text communication 218 or transcribed from the audio data associated with the currently received communication. In some embodiments, the transcriber 242 and the natural language processor 250 is an integrated module configured to perform a combination of functions of the transcriber 242 and the natural language processor 250. Alternatively, in some embodiments, the transcriber 242 performs some of the text processing, and the natural language processor 250 performs additional text processing. The visual data processor 260 is configured to extract one or more visual features from the video data associated with the currently received communication.

In some embodiments, the meeting server 220 is further configured to receive an agenda 217 of the meeting. The meeting agenda 217 includes multiple agenda items. The natural language processor 250 includes an agenda parser 252 configured to analyze text data associated with the agenda 217 to extract one or more textual features for each of the agenda items. The natural language processor 250 is also configured to analyze text data associated with the current communication to extract one or more features corresponding to the current communication. The natural language processor 250 or the agenda parser 252 is also configured to determine a correlation between currently received communication with each of the plurality of agenda items based on the textual corresponding to the currently received communication and the textual feature corresponding to each of the agenda items.

Various algorithms are implemented to determine the correlations. For example, in some embodiments, a correlation is a distance between a vector of the textual features extracted from the currently received communication and a vector of the textual features extracted from the agenda item. The closer the determined distance, the more correlated the currently received communication is with the agenda item. Based on the determined correlations between the currently received communication and the multiple agenda items, a particular agenda item that has a highest correlation with the currently received communication can be identified.

In some embodiments, the meeting server 220 sends the determined correlations to one or more client systems 120, 130 directly. In some embodiments, the server system 200 further processes the determined correlations and visualize them. For example, in some embodiments, the server system 200 is configured to generate a heatmap or a Venn diagram, representing the correlation between each agenda item and the current communication, and cause the generated heatmap or Venn diagram to be presented at the client system 120, 130.

Figure 3A:
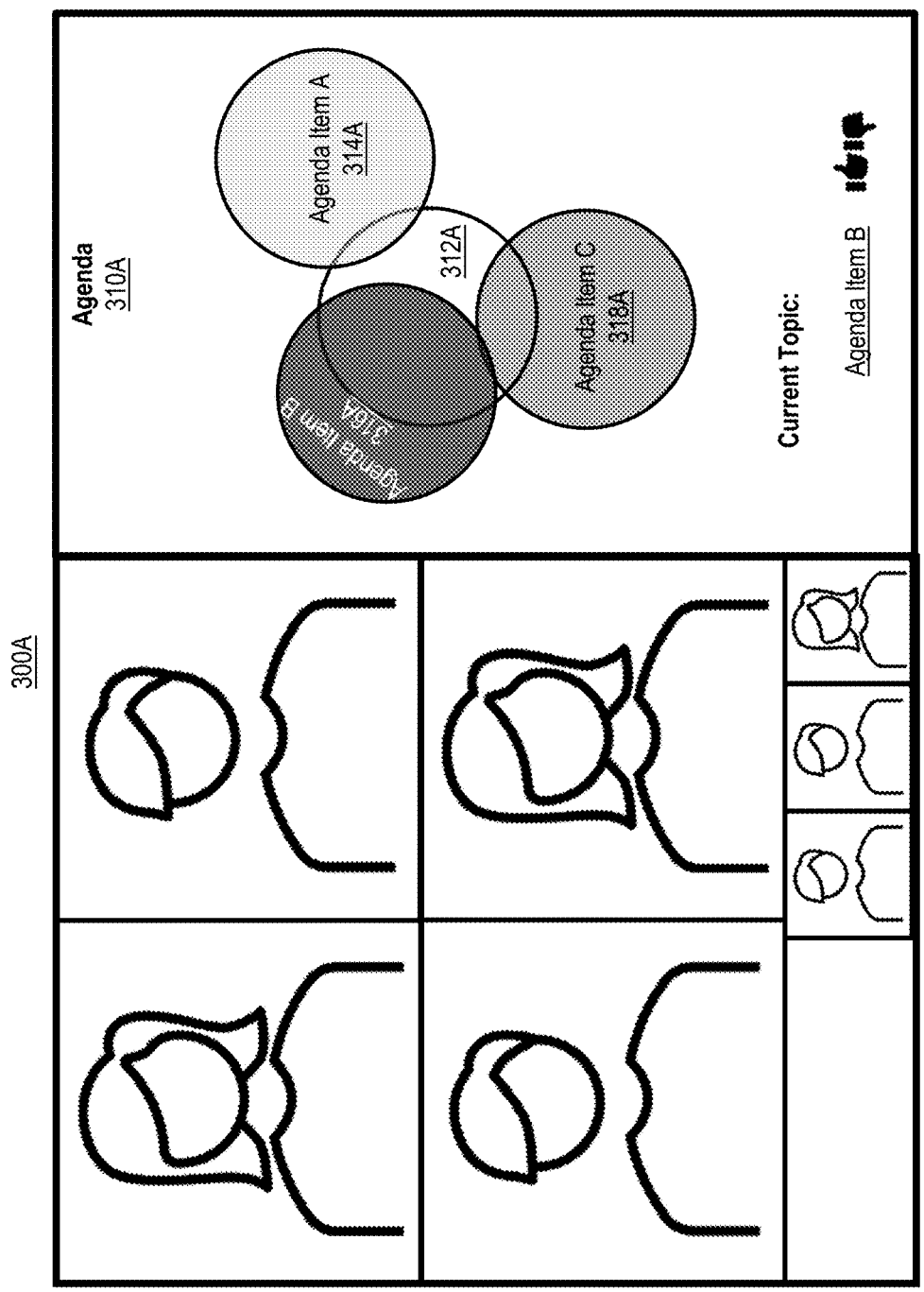
FIG. 3A illustrates an example of a user interface of a client meeting application that displays a Venn diagram, indicating the correlation of currently received communication with each agenda item identified by an AI engine.

FIG. 3A illustrates an example of a user interface 300A of a client meeting application that corresponds to the user interface 124, 134 of FIG. 1. The user interface 300A includes an agenda area 310A that shows a Venn diagram, indicating the correlation of the currently received communication with each of the plurality of agenda items. The Venn diagram includes multiple circles 312A, 314A, 316A, and 318A. One of the circles 312A represents the currently received communication, and each of the rest of the circles 314A, 316A, 318A represents a separate agenda item, namely, agenda item A, agenda item B, and agenda item C. The amounts of overlap between the circles 312A, 314A, 316A, and 318A represent the correlation between the agenda items and the currently received communication.

As illustrated, the circle 316A (representing agenda item B) has the largest overlap area that overlaps the circle 312A (representing the currently received communication). Thus, the agenda item B is identified to have the highest correlation with the currently received communication.

Figure 3B:
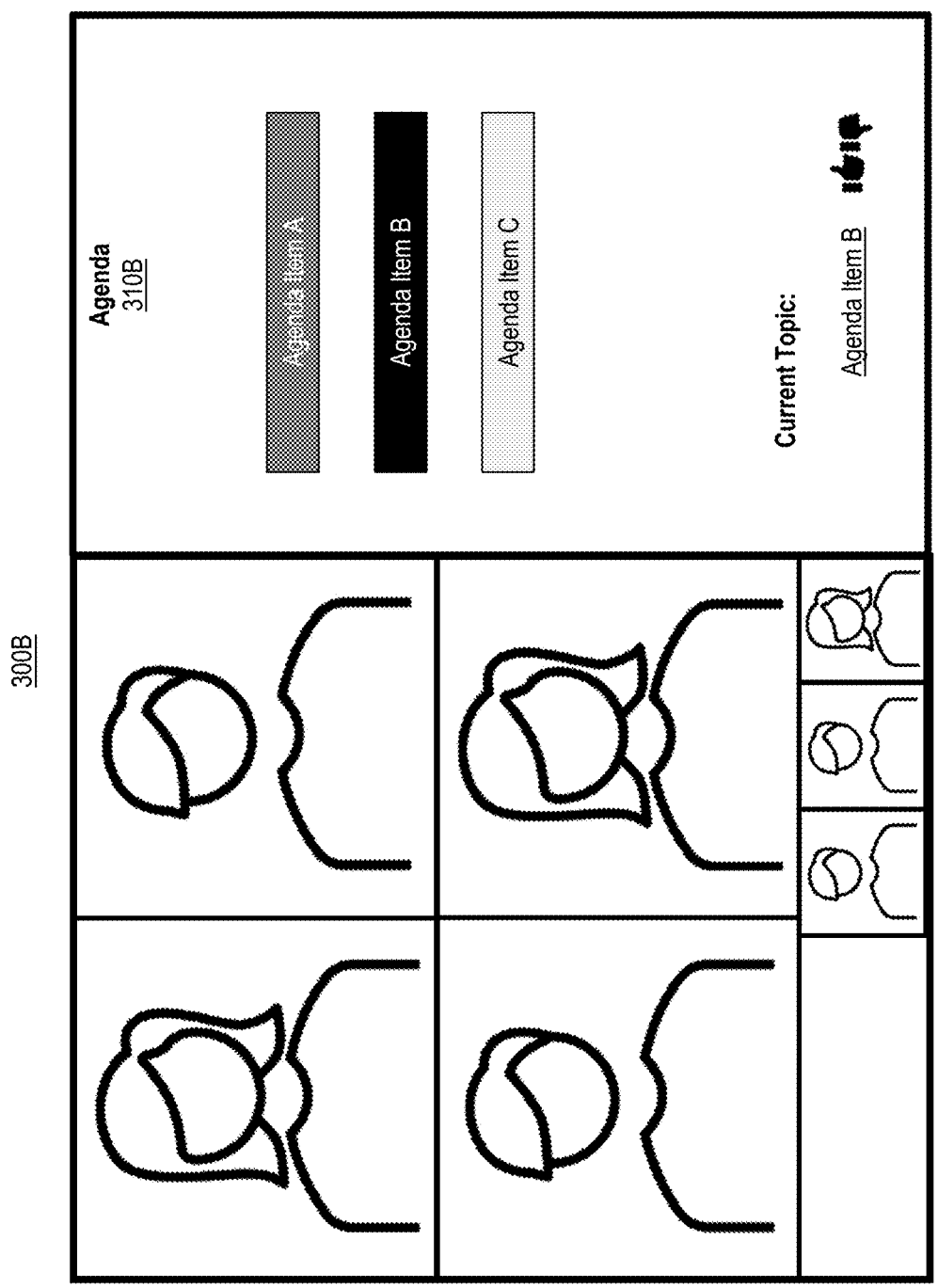
FIG. 3B illustrates an example of a user interface of a client meeting application that displays a heatmap, indicating the correlation of currently received communication with each agenda item identified by an AI engine.

FIG. 3B illustrates another example of a user interface 300B of a client meeting application that corresponds to the user interface 124, 134 of FIG. 1. As illustrated, the user interface 300B also includes an agenda area 310B, and the agenda area 310B shows each of the agenda items as a heatmap. For example, in some embodiments, each agenda item is displayed in a particular color based on the correlation of the currently received communication therewith. For example, in some embodiments, the most relevant agenda item is colored in a first color (e.g., green), and the least relevant agenda item is colored in a second color (e.g., red); or the most relevant agenda item is colored in a darker color, and the least relevant agenda item is colored in a lighter color. In some embodiments, the participants 150, 160 are allowed to define their own color themes for the heatmap.

Further, as illustrated in FIGS. 3A and 3B, the identified agenda item (e.g., agenda item B) that is the most relevant to the currently received communication is also presented in the user interface 300A or 300B, notifying the participants 150, 160 of the current topic that is being discussed. In some embodiments, an input field, such as a thumb up and/or a thumb down icons, is displayed next to the identified agenda item (e.g., agenda item B), and a participant 150, 160 can click on the thumb up or thumb down icon to confirm or reject the identified current agenda item. In some embodiments, a drop-down list including other agenda items is presented next to the currently identified agenda item, and a participant 150, 160 is allowed to select a different agenda item from the drop-down list. In some embodiments, an input field is a text input field, and a participant 150, 160 can freely type in any text to replace the currently identified agenda item. In some embodiments, the user's feedbacks are further used as training data to continue to train the AI model, such that the AI model continuously improves as time goes on, and in a next meeting, more agenda items can be identified correctly.

Alternatively, or in addition, a combination of thumb up/thumb down icons, a drop-down list, and/or a text field is implemented. For example, after a participant clicks the thumb down icon, another input field, such as a drop-down list including other agenda items, is presented to the participant, allowing the participant to select a different agenda item. In some embodiments, the input field is a text input field that allowing a participant to freely type in any text to replace the currently identified agenda item.

Notably, since the communication is ongoing, and the content of the currently received communication is constantly changing, the heatmap 310B and/or the Venn diagram 310A are dynamic and constantly changing.

Further, in some embodiments, the server system 200 causes the multiple agenda items to be displayed at the client systems 120, 130 as a list. When the server system 200 identifies the particular agenda item that has the highest correlation with the current communication, the server system 200 sends the particular agenda item to the client systems 120, 130, causing the particular agenda item to be displayed in a different format on the list. For example, the particular agenda item is displayed in a different size, color, font, and/or be highlighted, moving, and/or flashing.

Figure 3C:
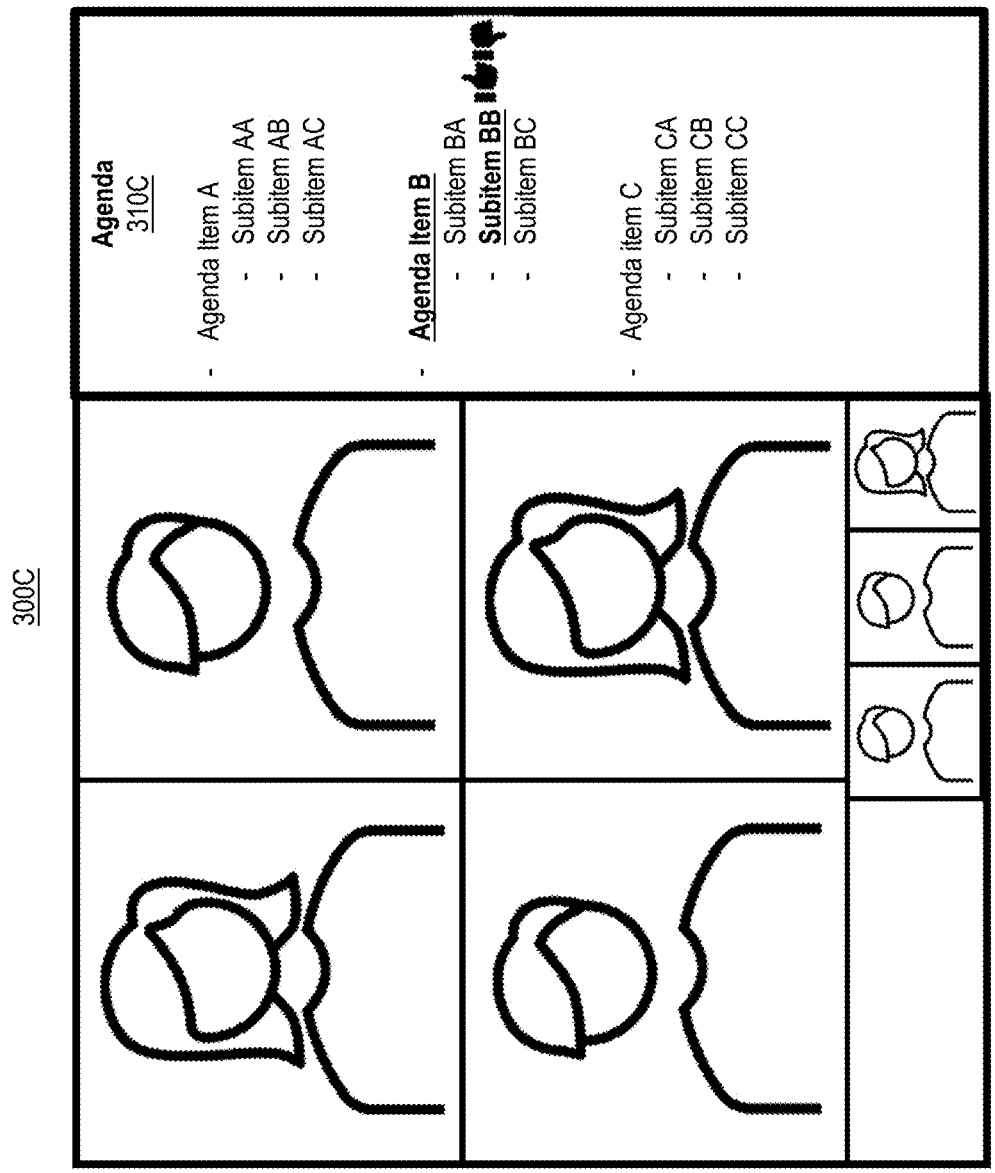
FIG. 3C illustrates an example of a user interface of a client meeting application that displays an agenda item that is identified by an AI engine as the most relevant to currently received communication.

FIG. 3C illustrates another example of a user interface 300C of a client meeting application that corresponds to the user interface 124, 134 of FIG. 1. As illustrated, the user interface 300C includes an agenda area 310C that displays the agenda of the meeting. The agenda includes multiple agenda items (such as, agenda item A, agenda item B, agenda item C). In some cases, each agenda item includes one or more subitems. For example, there are multiple subitems, namely, subitem AA, subitem AB, subitem AC, under the agenda item A.

The AI engine 230 and/or the agenda parser 252 has identified that agenda item B and its subitem BB are the most relevant items to the currently received communication, and sent the client system 120, 130 the identified agenda item B and/or subitem BB. In response to receiving the identified agenda item B and its subitem BB, the client system 120, 130 causes the agenda item B and the subitem BB to be displayed in a different format than the rest of the agenda items. As illustrated, the agenda item B and the subitem BB are displayed in a bold and underlined font. Similarly, an input field, such as a thumb up, and/or a thumb down, a drop down list, and/or a text field, is displayed next to the identified agenda item (e.g., subitem BB), and a participant 150, 160 enters an input via the input field to accept, reject, and/or modify the identified agenda item.

In some embodiments, the natural language processor 250 also includes a task finder 256 configured to identify that a task is assigned to a particular participant 150, 160 based on the textural features extracted from the text data associated with the currently received communication. The identified task is then sent to at least one of the client systems 120, 130 corresponding to the particular participant. In some embodiments, the sending of the task to the client system of the particular participant 150, 160 causes the task to be added to a task list of the client system 120, 130.

For example, as illustrated in FIG. 1, each client system 120, 130 includes a task application 126, 136 configured to organize and manage users' tasks. Alternatively, the task application 126, 136 is a component of the client meeting application 132 or a cloud application that is stored at a cloud service. In either case, in embodiments, when a task for a particular participant 150, 160 is identified, the meeting server 112 causes the client meeting application 132 to add the task to the particular participant's task application 126, 136.

In some embodiments, the natural language processor 250 also includes a decision finder 254 configured to identify that a decision is made based on the textural features extracted from the text data associated with the currently received communication. In some embodiments, the decision finder 254 is configured to append a newly identified decision to a list of decisions that are previously identified during the meeting and send the list of decisions to the client systems 120, 130 at the end of the meeting.

Figure 3D:
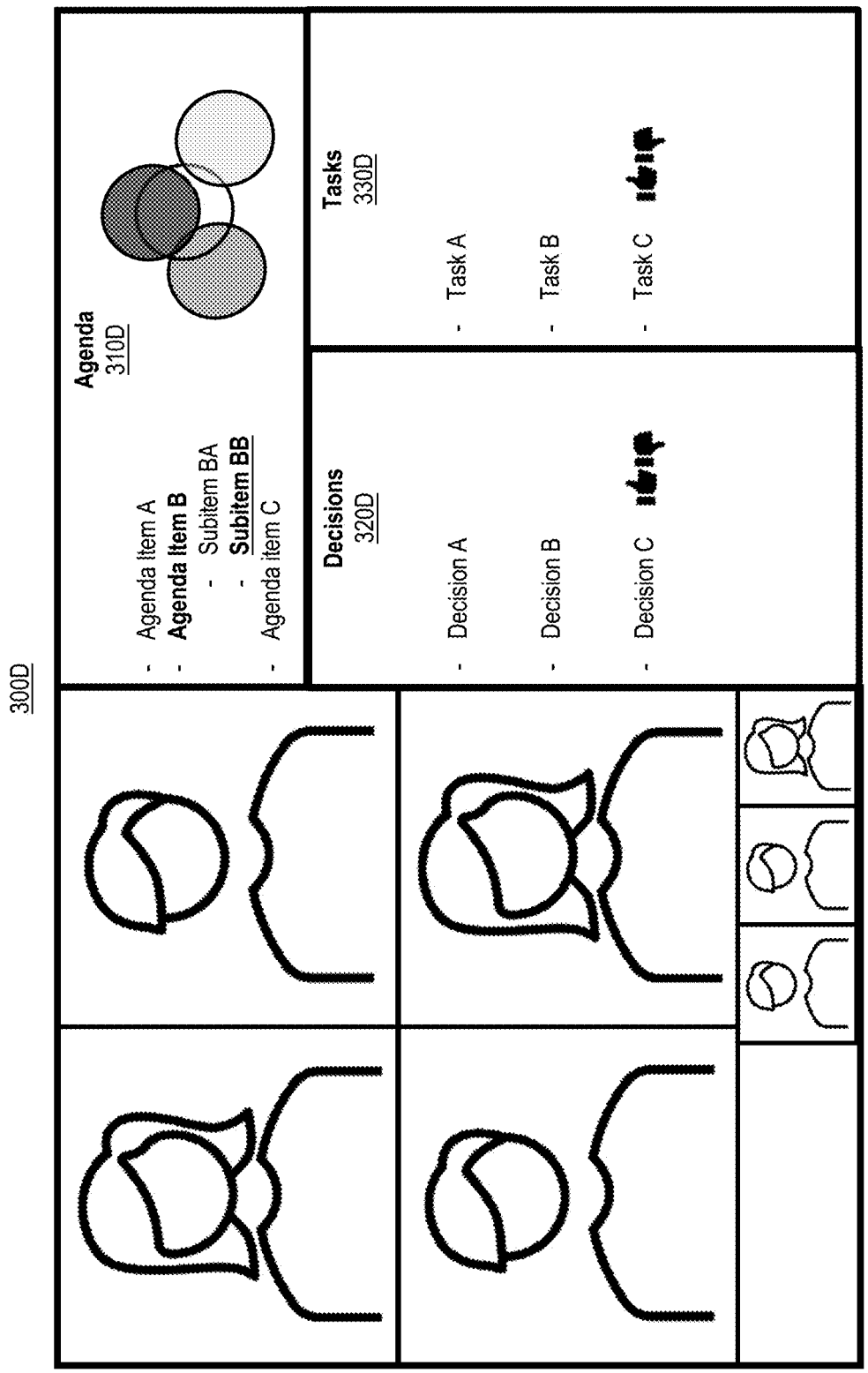
FIG. 3D illustrates an example of a user interface of a client meeting application that displays a list of decisions made, or a list of tasks assigned during a meeting, wherein the list of decisions and the list of tasks are identified by an AI engine.

FIG. 3D illustrates another example of a user interface 300D of a client meeting application that corresponds to the client meeting application 122, 132 of FIG. 1. As illustrated in FIG. 3D, the user interface 300D includes an area 320D displaying a list of decisions made during the meeting and an area 330D displaying a list of tasks assigned during the meeting. An input field is displayed at the most recently identified decision (e.g., decision C) or task (e.g., task C) to allow participants to confirm, reject, or modify it.

In some embodiments, the AI engine 230 is further configured to determine an amount of communication (e.g., time of speaking, number of words spoke) received from each of the client systems 120, 130 for each of the agenda items. In some embodiments, the visual data processor includes a facial expression finder 262 configured to determine a current facial expression of each participant based on the visual features extracted from the visual data associated with the currently received communication. The facial expressions of each participant is then used to determine the interest level of the participant. In some embodiments, other communication data (such as tone of voice, amount of communication received) is also used in combination with visual data to determine the interest level.

In some embodiments, the AI engine 230 is further configured to generate a heatmap representing the amount of communication received from each of the multiple client systems for each of the agenda items. Alternatively, or in addition, the AI engine 230 is configured to generate a heatmap representing the current level of interest of each participant. The server system 200 then causes the heatmap (s) to be displayed at the client systems 120, 130.

Figure 3E:
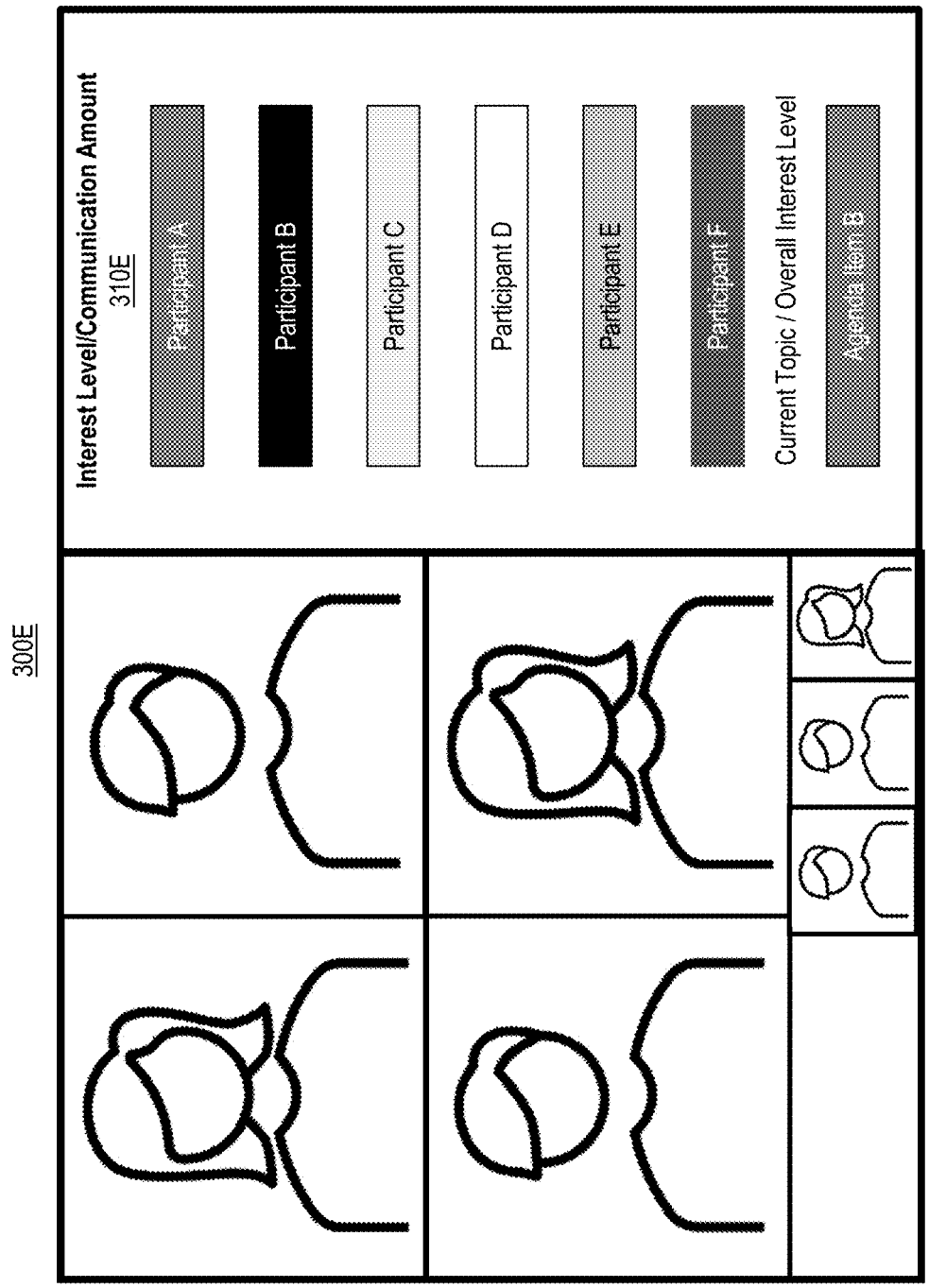
FIG. 3E illustrates an example of a user interface of a client meeting application that displays a heatmap, indicating an interest level and/or a communication amount of each participant identified by an AI engine.

FIG. 3E illustrates another example of a user interface 300E of a client meeting application that corresponds to the user interface 124, 134 of FIG. 1. The user interface 300E includes an area 310E displaying a heatmap indicating an interest level and/or communication amount of each participant A-F. In some embodiments, the heatmap 310E indicates an amount of communication that each participant has communicated. In some embodiments, the heatmap 310E indicates an interest level of each participant. In some embodiments, an overall interest level and/or an average communication amount is also generated and displayed in the user interface 300E. As such, the meeting organizers, as well as the participants, can better understand an overall interest of a particular agenda item or a current topic.

In some embodiments, the AI engine 230 is further configured to send a notification to a particular client system based on the amount of communication received from the particular client system. For example, when a participant has not been communicating for a predetermined period of time, a notification is generated at the client system corresponding to the participant, prompting the participant to talk more. As another example, when a participant has been having an interest level less than a predetermined threshold for a predetermined period of time, a notification is generated at the client system corresponding to the participant, asking whether the participant has any concern or question.

In some embodiments, the natural language processor 250 is further configured to identify that a task is assigned to a particular participant based on the textual features extracted from the text data associated with the received communication. The task is then sent to at least one client system 120, 130 corresponding to the particular participant 150, 160. In some embodiments, the sending of the task to the client system 120, 130 of the particular participant 150, 160 causes the task to be displayed at the client system of the particular participant 150, 160 and causes an input field to be displayed next to the displayed task. The input field is configured to (1) receive a confirmation or rejection from the client system of the particular participant 150, 160, or (2) receive a manual input modifying the task. In some embodiments, the sending of the task to the client system of the particular participant causes the task to be added to a task list of the client system 120, 130.

In some embodiments, the AI engine 230 is further configured to allocate a time period for each of the plurality of the agenda items and track a time spent on each agenda item and a time left in the meeting. In response to determining that a particular agenda item has taken longer than the allocated time period, the computing system is configured to send a notification to at least one of the client systems. In response to receiving the notification, a participant 150, 160 is allowed to reallocate a time for the currently discussed agenda item and/or the agenda items that are not yet discussed.

In some embodiments, the real-time analysis of the current meeting communication also includes analyzing the currently received communication against content in previously recorded meetings. For example, in some embodiments, when one of the meeting participants 150, 160 asks about a decision that has been made in a previous meeting, the AI engine 230 retrieves and send the previous decision to the client systems 120, 130, reminding the participants 150, 160 about the previous decision. As another example, when a participant 150, 160 asks about a status of a task that is previously assigned to one of the participants 150, 160, the client system of the particular participant is caused to display their task list and show the progress of the task. Furthermore, in some embodiments, the currently received communication is analyzed with the content on the public Internet or a private intranet. For example, when a participant asks a question related to a company policy, the AI engine 230 retrieves the relevant section of the company policy from the company's intranet, and causes the relevant section of the company policy to be displayed at the client system of the participant.

Furthermore, in some embodiments, a portion of the tasks handled by the AI engine 230 is distributed to each of the client systems 120, 130. For example, in some embodiments, a part of the real-time visual data processing is implemented at each of the client systems 120, 130, and each client system 120, 130 includes a custom machine-learning module to identify the particular participant's facial expressions. As another example, the heatmaps and/or Venn diagrams are generated by the client system 120, 130 based on the raw data received from the server system 110, and each participant 150, 160 is allowed to select what type of diagrams they prefer to see.

The following discussion now refers to a number of methods and method acts that are performed. Although the method acts are discussed in a certain order or illustrated in a flow chart as occurring in a particular order, no particular ordering is required unless specifically stated, or required because an act is dependent on another act being completed prior to the act being performed.

Figure 4:
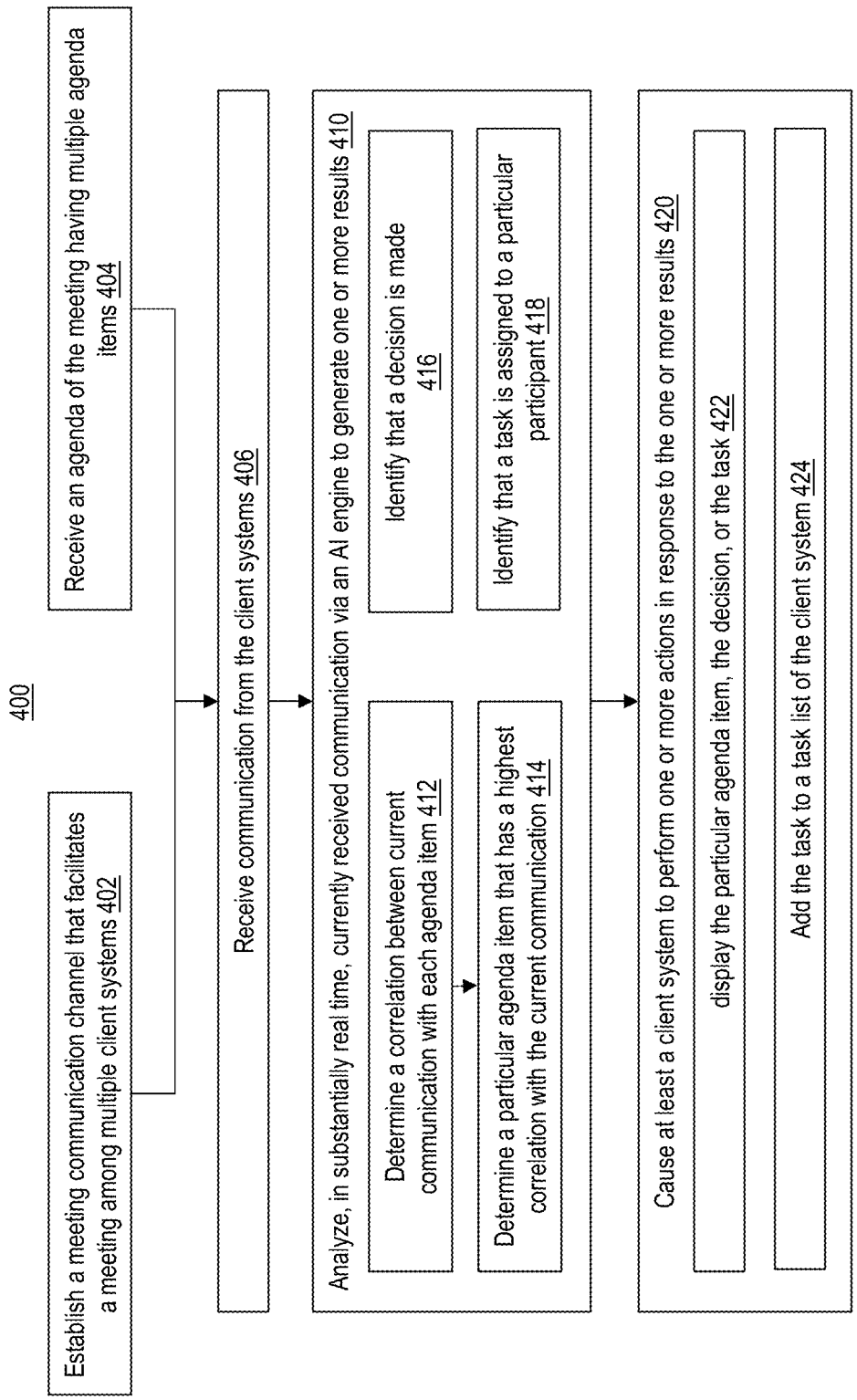
FIG. 4 illustrates an example of a method for real-time analyzing meeting communication using AI.

FIG. 4 illustrates a flowchart of an example method 400 for real-time analyzing meeting conversations using conversational artificial intelligence, which is implemented at the server system 110 of FIG. 1. The method 400 includes establishing a meeting communication channel that facilitates a meeting among multiple client systems (act 402). In some embodiments, the method 400 also includes receiving an agenda of the meeting having multiple agenda items (act 404). When communication from the plurality of client systems is received (act 406), currently received communication is analyzed, in substantially real time, via an AI engine (act 410). In some embodiments, the currently received communication includes communication received within a predetermined time window ending at a current time, such as 1 minute, 3 minutes, 5 minutes, etc.

In some embodiments, the real-time analysis of the currently received communication includes (but are not limited to) determining a correlation between currently received communication with each agenda item (act 412) and determining a particular agenda item that has a highest correlation with the currently received communication (act 414). In some embodiments, the generating of the one or more results also include generating a Venn diagram and/or a heatmap representing the correlations between the currently received communication with each of the agenda items.

Different methods are used to determine a correlation between the currently received communication and each of the agenda items. In some embodiments, text data associated with each of the agenda items is analyzed by a natural language processor (e.g., natural language processor 250) to extract one or more textual features; and text data associated with the currently received communication is also analyzed by the natural language processor to extract one or more textual features. The textual features corresponding to each of the agenda items are compared with the textual features corresponding to the currently received communication to determine a correlation, and a particular agenda item that has the highest correlation with the currently received communication is then identified.

Alternatively, or in addition, the real-time analysis of the received communication further includes identifying that a decision is made (act 416) and/or identifying that a task is assigned to a particular participant (act 418).

In response to the results of the real-time analysis, at least one of the client systems is caused to perform an action (act 420). In some embodiments, the action includes displaying the particular agenda item, the decision, and/or the task to a corresponding participant (act 422). In some embodiments, the displaying the particular agenda items, decision, and/or the task include displaying a Venn diagram and/or a heatmap, representing the correlation between the currently received communication and each agenda item. In some embodiments, the action includes adding the task to a task list of the client system (act 424).

Finally, because the principles described herein is performed in the context of a computing system (for example, the server system 110, each of the client systems 120-130 is a computing system), some introductory discussion of a computing system will be described with respect to FIG. 5.

Computing systems are now increasingly taking a wide variety of forms. In some embodiments, computing systems are handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that are executed by a processor. In some embodiments, the memory takes a particular form and depends on the nature and form of the computing system. In some embodiments, a computing system is distributed over a network environment and includes multiple constituent computing systems.

Figure 5:
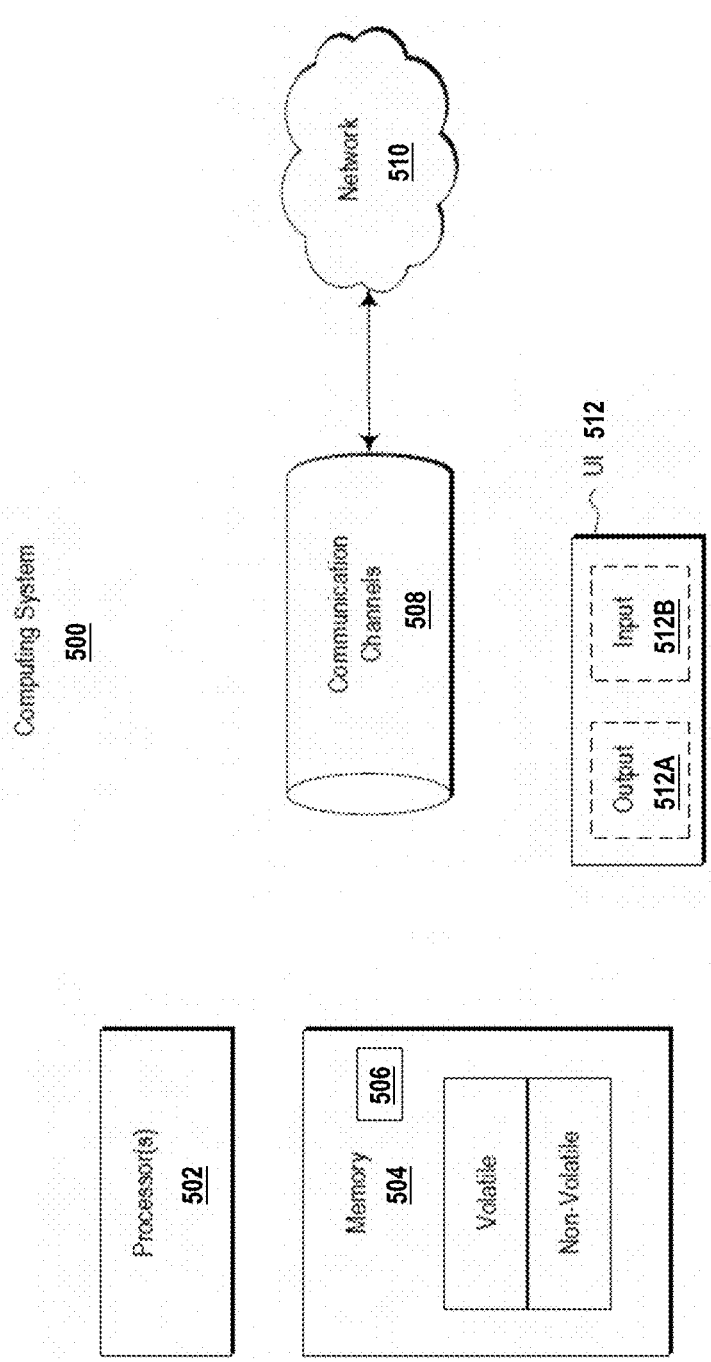
FIG. 5 illustrates an example computing system in which the principles described herein are employed.

As illustrated in FIG. 5, in its most basic configuration, a computing system 500 typically includes at least one hardware processing unit 502 and memory 504. In some embodiments, the processing unit 502 include a general-purpose processor. Alternatively, or in addition, the processing unit 502 also includes a field-programmable gate array (FPGA), an application-specific integrated circuit (ASIC), or any other specialized circuit. The memory 504 is a physical system memory, which is volatile, non-volatile, or some combination of the two. The term "memory" is also used herein to refer to non-volatile mass storage such as physical storage media. If the computing system is distributed, the processing, memory and/or storage capability is distributed as well.

The computing system 500 also has thereon multiple structures often referred to as an "executable component". For instance, memory 504 of the computing system 500 is illustrated as including executable component 506. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component includes software objects, routines, methods, and so forth, that are executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure is computer-readable directly by the processors (as is the case if the executable component were binary). Alternatively, the structure is structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, when the terms "component", "agent", "manager", "service", "engine", "module", "virtual machine" or the like are used, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, in some embodiments, such computer-executable instructions are embodied in one or more computer-readable media that form a computer program product. An example of such an operation involves the manipulation of data. In some embodiments, if such acts are implemented exclusively or near-exclusively in hardware, such as within an FPGA or an ASIC, some of the computer-executable instructions are hardcoded or hard-wired logic gates. The computer-executable instructions (and the manipulated data) are stored in the memory 504 of the computing system 500. In some embodiments, computing system 500 also contains communication channels 508 that allow the computing system 500 to communicate with other computing systems over, for example, network 510.

While not all computing systems require a user interface, in some embodiments, the computing system 500 includes a user interface system 512 for use in interfacing with a user. In some embodiments, the user interface system 512 include output mechanisms 512A as well as input mechanisms 512B. The principles described herein are not limited to the precise output mechanisms 512A or input mechanisms 512B as such will depend on the nature of the device. However, output mechanisms 512A might include, for instance, speakers, displays, tactile output, holograms and so forth. Examples of input mechanisms 512B might include, for instance, microphones, touchscreens, holograms, cameras, keyboards, mouse or other pointer input, sensors of any type, and so forth.

In some cases, embodiments described herein comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions configure the computing system to perform a certain function or group of functions. In some embodiments, the computer-executable instructions are, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention can be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention can also be practiced in distributed system environments where local and remote computing system, which are linked (either by hardwired data links, wireless data links, or by a combination of hardwired and wireless data links) through a network, both perform tasks. In a distributed system environment, program modules can be located in both local and remote memory storage devices.

Those skilled in the art will also appreciate that the invention can be practiced in a cloud computing environment. Cloud computing environments can be distributed, although this is not required. When distributed, cloud computing environments can be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The previously discussed figures discuss various computing system which corresponds to the computing system 500 previously described. The computing systems of the remaining figures include various components or functional blocks that implement the various embodiments disclosed herein. In some embodiments, the various components or functional blocks are implemented on a local computing system, or implemented on a distributed computing system that includes elements resident in the cloud or that implement aspect of cloud computing. The various components or functional blocks are implemented as software, hardware, or a combination of software and hardware. The computing systems of the remaining figures include more or less than the components illustrated in the figures and some of the components can be combined as circumstances warrant. Although not necessarily illustrated, the various components of the computing systems access and/or utilize a processor and memory, such as processor 502 and memory 504, as needed to perform their various functions.

For the processes and methods disclosed herein, the operations performed in the processes and methods are capable of being implemented in differing order. Furthermore, the outlined operations are only provided as examples, in some embodiments, some of the operations are optional, combined into fewer steps and operations, supplemented with further operations, or expanded into additional operations without detracting from the essence of the disclosed embodiments.

The present invention can be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system that hosts a meeting service having an artificial intelligence (AI) engine comprising:
   one or more processors; and
   one or more computer-readable media having stored thereon computer-executable instructions that are structured such that, when the computer-executable instructions are executed by the one or more processors, the computer-executable instructions configure the computing system to at least:

establish a meeting communication channel that facilitates a meeting among a plurality of client systems, each of the client systems corresponds to a meeting participant;

after the meeting is started, receive communication from the plurality of the client systems;

while the meeting remains active,
analyze currently received communication by an artificial intelligence (AI) engine, the currently received communication being communication received within a rolling time window ending at a current time, the rolling time window having a predetermined size and a predetermined shift amount;

identify (1) an agenda item that has a highest correlation with the currently received communication or (2) a task that is assigned to at least one of the participants based on the analysis; and cause, in substantially real time, at least one of the plurality of the client systems to (1) display the agenda item, or (2) add the task to a task list.

2. The computing system of claim 1, wherein the communication from the plurality of the client systems comprises at least one of (1) audio communication, (2) visual communication, (3) audiovisual communication, or (4) text communication, wherein the AI engine comprises at least one of (1) an audio data processor configured to process audio data associated with the audio communication or audiovisual communication, (2) a natural language processor configured to process text data associated with the text communication or text data transcribed from the audio communication or the audiovisual communication, or (3) a visual data processor configured to process visual data associated with the visual communication or audiovisual communication.

3. The computing system of claim 2, wherein:
the audio data processor includes a transcriber configured to transcribe, in substantially real time, audio data associated with the audio communication or the audiovisual communication into text data, the natural language processor configured to extract one or more textual features from the text data received from text communication or transcribed from the audio data associated with the audio communication or the audiovisual communication; and the visual data processor configured to extract one or more visual features from video data associated with the audiovisual communication.

4. The computing system of claim 3, wherein the natural language processor is further configured to:
identify that a task is assigned to a particular participant based on the textual features extracted from the text data associated with the currently received communication; and send the task to at least one of the plurality of client systems corresponding to the particular participant.

5. The computing system of claim 4, wherein the sending of the task to the client system of the particular participant causes the task to be added to a task list of the client system.

6. The computing system of claim 3, wherein the natural language processor is further configured to:
identify that a decision is made based on the textual features extracted from the text data associated with the currently received communication; and send the decision to one or more of the plurality of the client systems.

7. The computing system of claim 6, wherein the natural language processor is further configured to:
append the decision to a list of previous decisions identified during the meeting; and send the list of decisions to the one or more client systems at an end of the meeting.

8. The computing system of claim 3, wherein:
the computing system is further configured to receive an agenda of the meeting with a plurality of agenda items; and the natural language processor is further configured to:
extract one or more textual features for each of the plurality of the agenda items based on text data associated with the agenda;

extract one or more textual features based on text data associated with the currently received communication;

determine a correlation between the currently received communication and each of the plurality of agenda items based on the textual features corresponding to the currently received communication and the textual features corresponding to the agenda; and identify a particular agenda item that has a highest correlation with the currently received communication.

9. The computing system of claim 8, wherein the computing system is further configured to:
generate a Venn diagram or a heatmap, representing the correlation between the currently received communication and each of the plurality of agenda items; and cause the Venn diagram or the heatmap to be displayed at one or more of the plurality of the client systems.

10. The computing system of claim 8, wherein the computing system is further configured to send the particular agenda item that has the highest correlation with the currently received communication to one or more of the plurality of the client systems, causing the particular agenda item to be displayed at the at least one client system.

11. The computing system of claim 10, wherein the computing system is further configured to cause an input field to be displayed next to the displayed particular agenda item, the input field being configured to (1) receive a confirmation or rejection from the at least one client system, (2) receive a selection of a different agenda item included in the plurality of agenda items from the at least one client system; or (3) receive a manual input of a new agenda item that is not included in the plurality of agenda items from the at least one client system.

12. The computing system of claim 10, wherein:
the plurality of the agenda items are displayed at the at least one client system as a list; and the sending of the particular agenda item causes the particular agenda item that has the highest correlation with the currently received communication to be displayed in a different format than other agenda items in the plurality of the agenda items.

13. The computing system of claim 8, wherein the AI engine is further configured to:
allocate a time period for each of the plurality of the agenda items;

track a time spent on each agenda item and a time left in the meeting; and in response to determining that a particular agenda item has taken longer than the allocated time period, send a notification to at least one of the client systems.

14. The computing system of claim 8, wherein the AI engine is further configured to:

determine an amount of communication received from each of the plurality of client systems for each of the plurality of agenda items;
generate a heatmap representing the amount of communication received from each of the plurality of client systems for each of the plurality of agenda items; and
cause the heatmap to be displayed at one or more of the client systems.

15. The computing system of claim 14, wherein the computing system is further configured to send a notification to a particular client system based on the amount of communication received from the participant corresponding to the particular client system.

16. The computing system of claim 8, wherein the visual data processor is further configured to:
determine a current level of interest of each participant based on the visual features extracted from the visual data associated with the currently received communication;
generate a heatmap representing the current level of interest of each participant; and
cause the heatmap to be displayed at one or more of the client systems.

17. The computing system of claim 16, wherein the visual data processor is further configured to:
send a notification to a particular client system based on the current level of interest of the participant corresponding to the particular client system.

18. A method for real-time analyzing meeting communication using conversational artificial intelligence, the method comprising:
establishing a meeting communication channel that facilitates a meeting among a plurality of client systems, each of the client systems corresponds to a meeting participant;
after the meeting is started, receiving communication from the plurality of client systems, the communication from the plurality of the client systems comprising at least one of (1) audio communication, (2) audiovisual communication, or (3) text communication;
while the meeting remains active,
analyzing currently received communication via an artificial intelligence (AI) engine, the AI engine comprising at least one of (1) a transcriber configured to transcribe, in substantially real time, audio communication into text, (2) a natural language processor configured to analyze text transcribed from the audio communication or text received from the text communication to extract one or more textual features, or (3) a visual AI model configured to analyze visual data in the audio visual communication to extract one or more visual features, and the currently received communication being communication received within a rolling time window ending at a current time, the rolling time window having a predetermined size and a predetermined shift amount;
identifying (1) an agenda item that has a highest correlation with the currently received communication or (2) a task that is assigned to at least one of the participants based on the analysis; and
causing, in substantially real time, at least one of the plurality of the client systems to (1) display the agenda item, or (2) add the task to a task list.

19. The method of claim 18, the method further comprising:
receiving an agenda of the meeting with a plurality of agenda items;
extracting one or more textual features for each of the plurality of the agenda items based on text data associated with the agenda;
extracting one or more textual features based on text data associated with the currently received communication;
determining a correlation between the currently received communication and each of the plurality of agenda items based on the textual features corresponding to the currently received communication and the textual features corresponding to the agenda; and
identifying a particular agenda item that has a highest correlation with the currently received communication.

20. A computer program product comprising one or more hardware storage devices having stored thereon computer-executable instructions that are structured such that, when executed by one or more processors of a computing system, the computer-executable instructions cause the computer system to at least:
establish a meeting communication channel that facilitates a meeting among a plurality of client systems, each of the client systems corresponds to a meeting participant;
after the meeting is started, receive communication from the plurality of client systems, the communication from the plurality of the client systems comprising at least one of (1) audio communication, (2) audiovisual communication, or (3) text communication;
while the meeting remains active,
analyze currently received communication via an artificial intelligence (AI) engine, the AI engine comprising at least one of (1) a transcriber configured to transcribe, in substantially real time, audio communication into text, (2) a natural language processor configured to analyze text transcribed from the audio communication or text received from the text communication to extract one or more textual features, or (3) a visual AI model configured to analyze visual data in the audio visual communication to extract one or more visual features, and the currently received communication being communication received within a rolling time window ending at a current time, the rolling time window having a predetermined size and a predetermined shift amount;
identify (1) an agenda item that has a highest correlation with the currently received communication or (2) a task that is assigned to at least one of the participants based on the analysis; and
cause, in substantially real time, at least one of the plurality of the client systems to (1) display the agenda item, or (2) add the task to a task list.

\* \* \* \* \*